(12) United States Patent
Kang et al.

(10) Patent No.: US 9,898,164 B2
(45) Date of Patent: Feb. 20, 2018

(54) METHOD FOR MOVING OBJECT BETWEEN PAGES AND INTERFACE APPARATUS

(75) Inventors: Tae-young Kang, Seoul (KR); Yeon-hee Lee, Seoul (KR); Sang-ok Cha, Daegu (KR); Min-kyu Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/333,318

(22) Filed: Dec. 21, 2011

(65) Prior Publication Data
US 2012/0166987 A1    Jun. 28, 2012

(30) Foreign Application Priority Data
Dec. 28, 2010   (KR) .......................... 10-2010-0137230

(51) Int. Cl.
| | |
|---|---|
| *G06F 3/0483* | (2013.01) |
| *G06F 3/0486* | (2013.01) |
| *G06F 3/0484* | (2013.01) |
| *G06F 3/0481* | (2013.01) |
| *G06T 15/60* | (2006.01) |
| *G06F 3/0488* | (2013.01) |

(52) U.S. Cl.
CPC .......... *G06F 3/0483* (2013.01); *G06F 3/0486* (2013.01); *G06F 3/04883* (2013.01); *G06F 3/0481* (2013.01); *G06F 3/0484* (2013.01); *G06F 3/0488* (2013.01); *G06T 15/60* (2013.01)

(58) Field of Classification Search
CPC .... G06F 3/0488; G06F 3/0486; G06F 3/0481; G06F 3/0484; G06F 3/04883; G06F 3/0483; G06T 15/60

USPC .................................................. 715/765, 794
See application file for complete search history.

(56) References Cited

U.S. PATENT DOCUMENTS

| | | | |
|---|---|---|---|
| 5,774,664 A | 6/1998 | Hidary et al. | |
| 6,577,330 B1 | 6/2003 | Tsuda et al. | |
| 6,781,575 B1 * | 8/2004 | Hawkins ........... | H04M 1/27455 345/169 |
| 7,302,649 B2 | 11/2007 | Ohnishi | |

(Continued)

FOREIGN PATENT DOCUMENTS

| | | |
|---|---|---|
| CN | 1126025 | 7/1996 |
| CN | 1274439 | 11/2000 |

(Continued)

OTHER PUBLICATIONS

Russian Office Action dated Mar. 24, 2015 issued in counterpart application No. 2013135245/08.

(Continued)

*Primary Examiner* — Maryam Ipakchi
*Assistant Examiner* — Mong-Shune Chung
(74) *Attorney, Agent, or Firm* — The Farrell Law Firm, P.C.

(57) ABSTRACT

A method and apparatus for moving an object between pages is provided. The method includes displaying a first page including an object; generating a first signal in response to the object on the first page being moved to a predetermined area of the first page; displaying a plurality of pages, including the first page, in response to the first signal; generating a second signal in response to the object being moved to overlap with a second page; and moving the object to the second page in response to the second signal.

8 Claims, 15 Drawing Sheets

(56) References Cited

U.S. PATENT DOCUMENTS

| | | | |
|---|---|---|---|
| 9,310,993 B2 | 4/2016 | Choi | |
| 2006/0161868 A1* | 7/2006 | Van Dok et al. | 715/835 |
| 2007/0247440 A1* | 10/2007 | Shin et al. | 345/173 |
| 2008/0122796 A1 | 5/2008 | Jobs et al. | |
| 2008/0129757 A1 | 6/2008 | Tanaka et al. | |
| 2009/0058821 A1* | 3/2009 | Chaudhri et al. | 345/173 |
| 2009/0064055 A1* | 3/2009 | Chaudhri et al. | 715/863 |
| 2009/0150775 A1 | 6/2009 | Miyazaki et al. | |
| 2009/0178008 A1* | 7/2009 | Herz et al. | 715/840 |
| 2010/0083111 A1* | 4/2010 | de los Reyes | 715/702 |
| 2010/0088641 A1 | 4/2010 | Choi | |
| 2010/0090971 A1 | 4/2010 | Chol et al. | |
| 2010/0131880 A1 | 5/2010 | Lee et al. | |
| 2010/0218137 A1 | 8/2010 | Sim et al. | |
| 2010/0229088 A1 | 9/2010 | Nakajima et al. | |
| 2010/0283743 A1 | 11/2010 | Coddington | |
| 2010/0287494 A1* | 11/2010 | Ording | G06F 3/0481 715/790 |
| 2010/0295789 A1 | 11/2010 | Shin et al. | |
| 2010/0313165 A1* | 12/2010 | Louch et al. | 715/792 |
| 2011/0126155 A1* | 5/2011 | Krishnaraj et al. | 715/811 |
| 2011/0163971 A1 | 7/2011 | Wagner et al. | |
| 2011/0179368 A1* | 7/2011 | King et al. | 715/769 |
| 2011/0291945 A1* | 12/2011 | Ewing et al. | 345/173 |
| 2012/0062599 A1 | 3/2012 | MacHida | |
| 2012/0089950 A1* | 4/2012 | Tseng | 715/854 |
| 2015/0169211 A1 | 6/2015 | Shin et al. | |

FOREIGN PATENT DOCUMENTS

| | | |
|---|---|---|
| CN | 1020010022847 | 3/2001 |
| CN | 101452366 | 6/2009 |
| CN | 101566918 A | 10/2009 |
| CN | 101821707 A | 9/2010 |
| CN | 1020100124427 | 11/2010 |
| EP | 1 014 257 | 6/2000 |
| EP | 2 068 237 | 6/2009 |
| JP | 11-65806 | 3/1999 |
| JP | 2000-035842 | 2/2000 |
| JP | 2004172866 | 6/2004 |
| JP | 2009-157908 | 7/2009 |
| KR | 1020010022847 | 3/2001 |
| KR | 1020060125468 | 12/2006 |
| KR | 100706875 | 4/2007 |
| KR | 1020100038651 | 4/2010 |
| KR | 1020100124427 | 11/2010 |
| RU | 2 347 261 | 2/2009 |
| RU | 2 400 801 | 9/2010 |
| WO | WO 99/08178 | 2/1999 |
| WO | WO 2009/143076 | 11/2009 |
| WO | WO 2010/111003 | 9/2010 |
| WO | WO 2010/137121 | 12/2010 |

OTHER PUBLICATIONS

Chinese Office Action dated Oct. 30, 2015 issued in counterpart Appln. No. 201180063463.7, 19 pages.
Japanese Office Action dated Jan. 8, 2016 issued in counterpart Appln. No. 2013-547287, 5 pages.
"Go Launcher 1.2 Screenshots", XP055248926, Dec. 17, 2010, 1 page.
Anonymous: [App] Go Launcher 1.1.3 Released—Android Development and Hacking, XP055248554, Dec. 17, 2010, 2 pages.
Anonymous: "Go Launcher (Ex) Turboschnell", XP055248575, Dec. 16, 2010, 7 pages.
Anonymous: "Windows-Hopping Deluxe—Switcher", XP055248238, Nov. 14, 2009, 2 pages.
European Search Report dated Feb. 17, 2016 issued in counterpart application No. 11852922.1-1972, 8 pages.
Nich Gray: "Video: HTC Sense on Android 2.1 Enable Pinch-to-Zoom on Home Screen—HTC Source", XP055278180, Feb. 10, 2010, 4 pages.
Korean Office Action dated Jun. 30, 2016 issued in counterpart application No. 10-2010-0137230, 9 pages.
European Search Report dated Jun. 17, 2016 issued in counterpart application No. 11852922.1-1972, 19 pages.
Chinese Office Action dated Jul. 1, 2016 issued in counterpart application No. 201180063463.7, 26 pages.
Australian Examination Report dated Jul. 19, 2016 issued in counterpart application No. 2011350307, 2 pages.
Chinese Office Action dated Dec. 29, 2016 issued in counterpart application No. 201180063463.7, 22 pages.
Korean Office Action dated Jan. 20, 2017 issued in counterpart application No. 10-2010-0137230, 7 pages.
Korean Office Action dated Mar. 13, 2017 issued in counterpart application No. 10-2010-0137230, 11 pages.
Russian Office Action dated Oct. 31, 2014 issued in counterpart application No. 2013135245/08.
Korean Final Rejection dated Sep. 26, 2017 issued in counterpart application No. 10-2010-0137230, 7 pages.
Chinese Notification of Reexamination dated Nov. 7, 2017 issued in counterpart application No. 201180063463.7, 19 pages.
Korean Non-Final Rejection dated Dec. 18, 2017 issued in counterpart application No. 10-2017-0140314, 10 pages.

\* cited by examiner

| Status | | |
|---|---|---|
| ◁Jukebox | All | Manage |
| 🔍Quick | | |
| 👤 | Tik Tok Let's Party – Ke$ha | |
| 🎵 | I'm Yours We sing, We Dance, We Steal … | |
| 🎵 | Say You Love Me Eternal Love – MYMP | |
| 🎵 | Aimer Romeo Et Juliette – Various Artists | |
| 🎵 | Evergreen Evergreen – Susan Jacks | |
| 👤 | Yesterday The Beatles 1 – Beatles | |
| Recent | Frequent (Song) User's ▶ | |

1020

| Status | | |
|---|---|---|
| ◁Jukebox | All | Manage |
| 🔍Quick | | |
| A | | |
| 🎵 | Aimer Romeo Et Juliette – Various Artists | |
| 🎵 | Angel World Of Our Own – Westlife | |
| 🎵 | Atmosphere Us And Them – Shinedown | |
| B | | |
| 🎵 | Back To Black Vir de Bordeaux – Amy Winehouse | |
| 👤 | Bubble Phychology – Discover America | |
| Recent | Frequent Song User's ▶ | |

1030

| Status | | |
|---|---|---|
| ◁Jukebox | All | Manage |
| A | | |
| B | | |
| C | | |
| D | | |
| E | | |
| F | | |
| H | | |
| I | | |
| K | | |
| L | | |
| M | | |
| N | | |
| O | | |
| R | | |
| S | | |
| T | | |
| U | | |
| W | | |
| Y | | |
| Recent | Frequent Song User's ▶ | |

1040

| Status | | |
|---|---|---|
| ◁Jukebox | All | Manage |
| Y | | |
| ㄱ | | |
| ㄴ | | |
| ㄷ | | |
| ㄹ | | |
| ㅁ | | |
| ㅂ | | |
| ㅅ | | |
| ㅇ | | |
| ㅈ | | |
| ㅊ | | |
| ㅋ | | |
| ㅌ | | |
| ㅍ | | |
| ㅎ | | |
| 123 | | |
| !@#$#% | | |
| Recent | Frequent Song User's ▶ | |

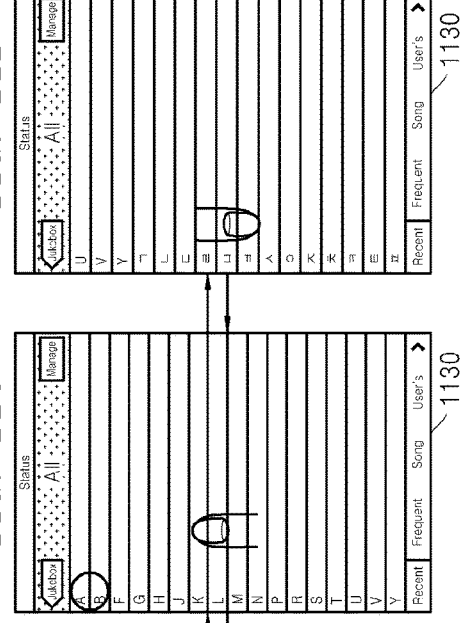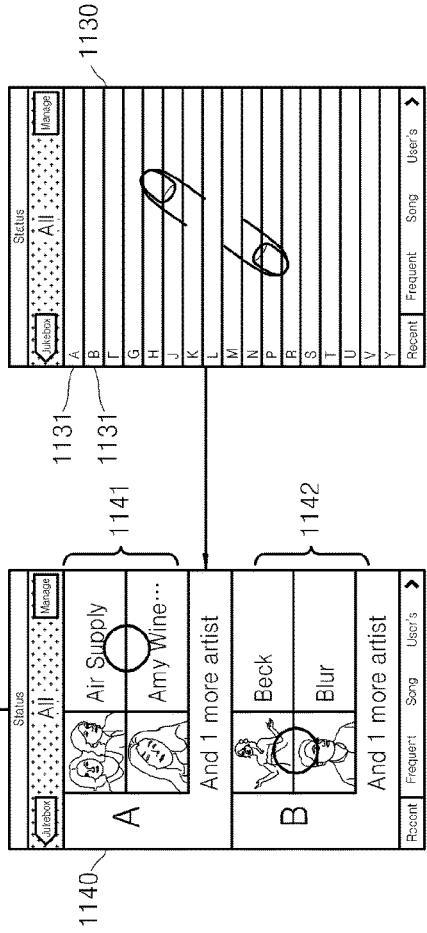

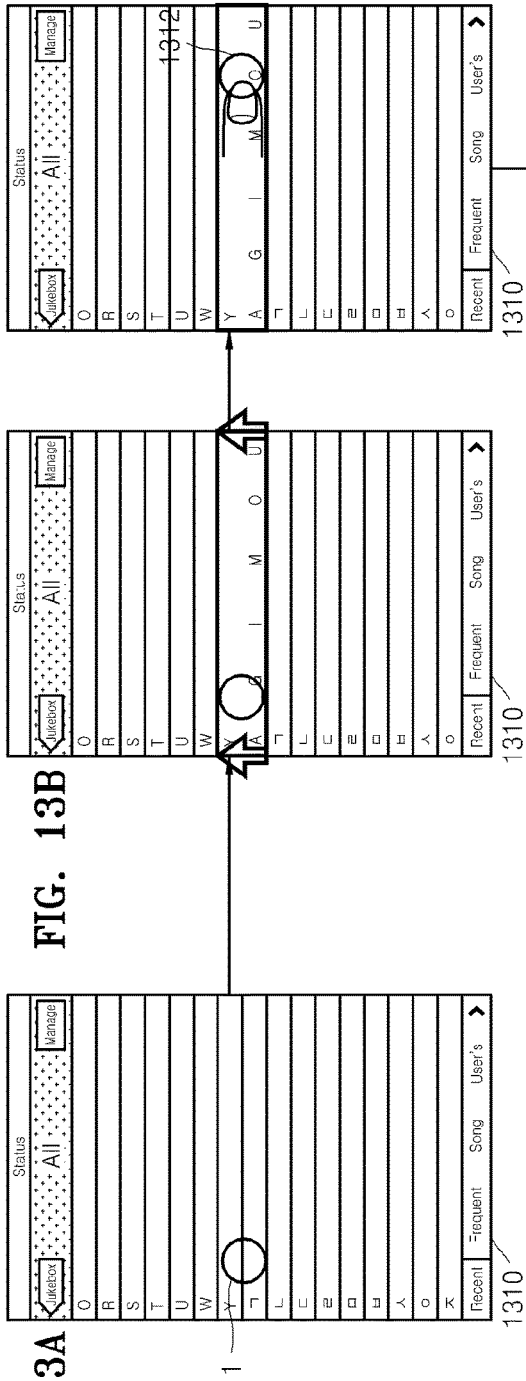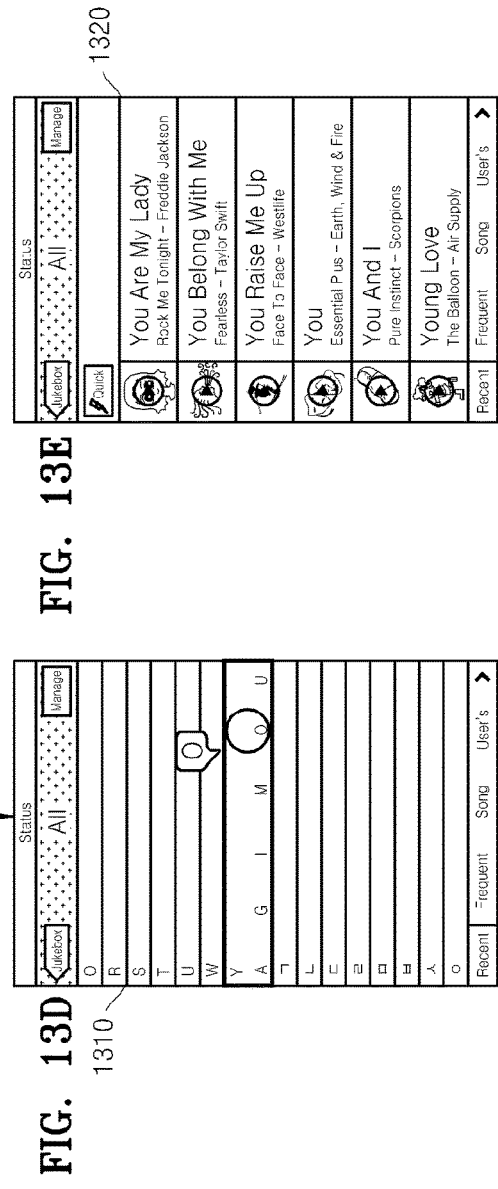

METHOD FOR MOVING OBJECT BETWEEN PAGES AND INTERFACE APPARATUS

PRIORITY

This application claims priority under 35 U.S.C. § 119(a) to Korean Patent Application No. 10-2010-0137230, filed on Dec. 28, 2010, in the Korean Intellectual Property Office, the entire disclosure of which is incorporated herein by reference.

BACKGROUND OF THE INVENTION

1. Field of the Invention

The present invention relates generally to a method and apparatus for moving an object between pages, and more particularly, to a method and apparatus for moving an object on a first page to a second page using a touchpad.

2. Description of the Related Art

Currently, the popularization of smartphones has made various functions previously only available through Personal Computers (PCs), available on smartphones. However, due to the nature of smartphones focusing on portability, the sizes of their displays and interfaces are generally small. In particular, the limitation of the size of a touchpad functioning both as an interface and a display makes it difficult to accurately perform a user input.

SUMMARY OF THE INVENTION

Accordingly, the present invention has been made to solve the above-stated problems occurring in the prior art, and an aspect of the present invention provides an apparatus and a method for effectively moving an object between pages in an interface apparatus including a touchpad.

In accordance with an aspect of the present invention, a method of moving an object between pages is provided. The method includes displaying a first page including the object; generating a first signal in response to the object on the first page being moved to a predetermined area of the first page; displaying a plurality of pages, including the first page, in response to the first signal; generating a second signal in response to the object being moved to overlap with a second page; and moving the object to the second page in response to the second signal In accordance with another aspect of the present invention, an interface apparatus is provided. The apparatus includes a first generator for generating a first signal in response to the object on the first page being moved to a predetermined area of the first page; a display unit for displaying the first page including an object, and displaying a plurality of pages, including the first page, in response to the first signal; a second generator for generating a second signal in response to the object being moved to overlap with a second page; and a page construction unit for moving the object to the second page in response to the second signal.

BRIEF DESCRIPTION OF THE DRAWINGS

The above and other aspects, features and advantages of the present invention will become more apparent by describing in detail embodiments thereof with reference to the attached drawings, in which:

FIGS. 9A through 9B are a second illustration of rearranging a page based on a pinching input, according to an embodiment of the present invention;

FIGS. 10A through 10D are a third illustration of rearranging a page based on a pinching input, according to an embodiment of the present invention;

FIGS. 11A through 11F is a fourth illustration of rearranging a page based on a pinching input, according to an embodiment of the present invention;

FIGS. 13A through 13E are a seventh illustration of rearranging a page based on a pinching input, according to an embodiment of the present invention;

DETAILED DESCRIPTION OF EMBODIMENTS OF THE PRESENT INVENTION

Figure 1:
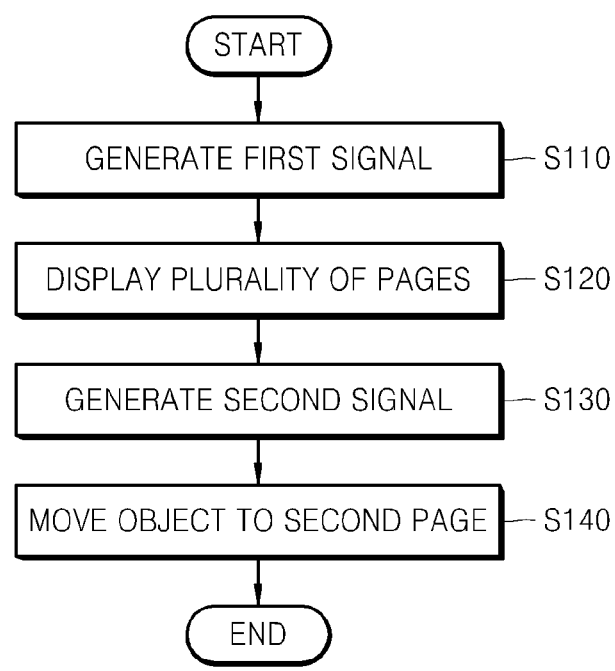
FIG. 1 is a flowchart illustrating a method of moving an object between pages, according to an embodiment of the present invention.

For convenience of description, terms used in the specification will be defined.

"Object'" denotes an object to be selected by a user. Examples of an object are an icon, a link, a picture, text, an index item in a page, and the like.

"Page" denotes a space including content, information, and/or an object. Examples of a page are a web page, a content list, a thumbnail list, a tray in which photographs are displayed, a tray in which icons are displayed, and the like.

"Tap" denotes an action of a user very quickly touching a screen with a fingertip or a stylus. That is, an action with a very short time difference between a touching-in time, i.e., a time at which the fingertip or stylus touches the screen, and a touching-out time, i.e., a time at which the fingertip or the stylus is no longer touching the screen.

"Touch & hold" denotes an action in which a user maintains a touch input for more than a critical time period after touching a screen with a fingertip or a stylus. That is, it indicates an action by which a time difference between a touching-in time and a touching-out time is greater than the critical time. To allow the user to determine whether a touch input is a tap or a touch & hold, when the touch input is maintained for more than the critical time, a feedback signal may be provided visually or audibly.

"Double tap" denotes an action of a user quickly touching a screen twice with a fingertip or a stylus. That is, a user taps a screen twice in short succession.

"Drag" denotes an action of a user touching a screen with a fingertip or a stylus and moving the fingertip or stylus to other positions on the screen while touching the screen. Due to a drag action, an object moves or a panning action described below is performed.

"Panning" denotes an action of a user performing a drag action without selecting any object. Since a panning action does not select a specific object, no object moves in a page. Instead, the whole page moves on a screen or a group of objects moves within a page.

"Flick" denotes an action of a user very quickly performing a drag action with a fingertip or a stylus. A flick action may be differentiated from a drag (or panning) action based on whether the speed of movement of the fingertip or the stylus is greater than a critical speed.

"Pinch input" denotes an action of a user touching a screen with a plurality of fingertips or styluses and widening or narrowing a distance between the plurality of fingertips or styluses while touching the screen. "Unpinching" denotes an action of the user touching the screen with two fingers, such as a thumb and a forefinger and widening a distance between the two fingers while touching the screen, and "pinching" denotes an action of the user touching the screen with two fingers and narrowing a distance between the two fingers while touching the screen. For example, when an unpinching input is received, a page may be zoomed out, and when a pinching input is received, a page may be zoomed in.

FIG. 1 is a flowchart illustrating a method of moving an object between pages, according to an embodiment of the present invention.

In step S110, if an object on a first page moves to a predetermined area by a user touching and dragging the object, a first signal is generated. According to another embodiments, only if the user moves the object to the predetermined area and touches the object for more than a predetermined time (touch & hold) without withdrawing their fingertip (or a stylus), the first signal may be generated. In some embodiments, only if the user touches the object, drags the object to the predetermined area, and holds the object for the critical time while continuing to touch the object, the first signal may be generated.

The predetermined area may be set in various locations. However, an area, such as an edge of a screen, which has been determined to be difficult for the user to intentionally move an object to may be preferably set as the predetermined area.

In step S120, a plurality of pages, including the first page, are displayed in response to the first signal. The plurality of pages may be displayed inclined in a depth direction (as depicted in FIG. 7) so that the user can view all of the plurality of pages at once.

In step S130, if the object overlaps with a second page by the user dragging the object onto the second page that is one of the plurality of pages, a second signal is generated. According to embodiments of the present invention, if the user drags the object onto the second page and touches the object for more than the critical time (i.e., touch & hold), the second signal may be generated.

In step S140, the object is moved to the second page in response to the second signal. Thereafter, only the second page is displayed by removing the other pages from the screen.

FIGS. 2A to 2E illustrate moving an object between pages, according to an embodiment of the present invention. In FIGS. 2A to 2E, moving an object is described based on a change of a screen in a terminal, for convenience of description.

Figure 2C:
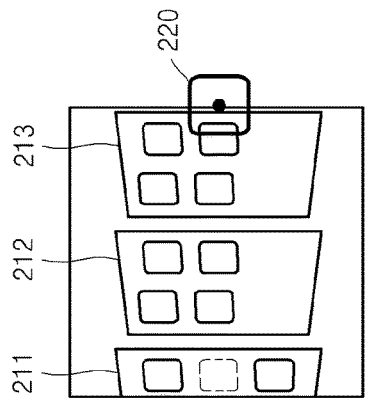
FIGS. 2A through 2E illustrate moving an object between pages, according to an embodiment of the present invention.
Figure 2E:
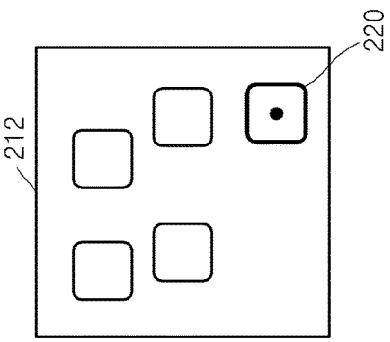
Figure 2B:
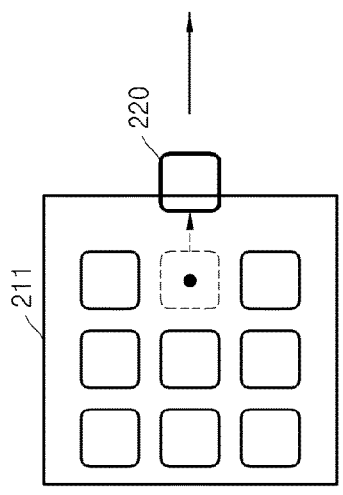
Figure 2D:
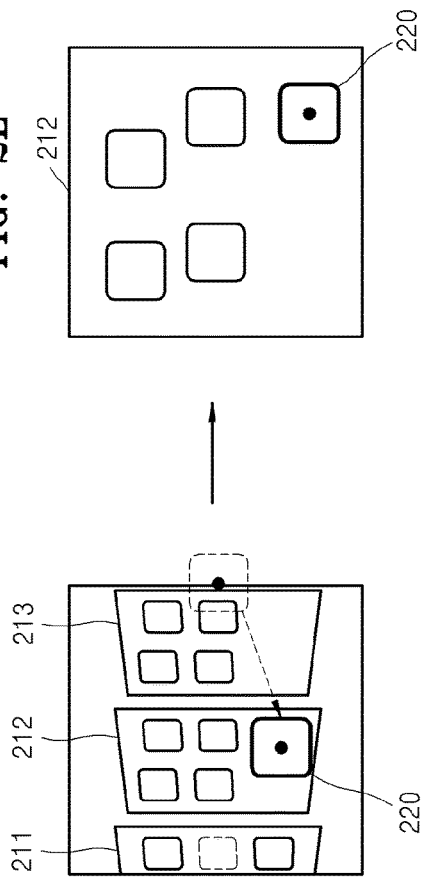
Figure 2A:
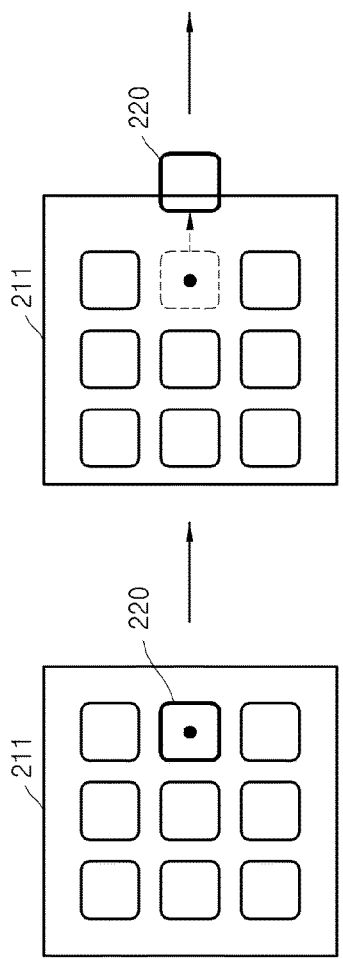

In FIG. 2A, a first page 211, including a plurality of objects, is displayed on a screen. A user selects an object 220 from among the plurality of objects. The user may select the object 220 by touching the object 220 for more than a critical time.

In FIG. 2B, the user drags the selected object 220 to a predetermined position. In FIG. 2, it is assumed that the predetermined position is an edge of the screen.

If the object 220 moves to the predetermined position, the first signal is generated. According to an embodiment of the present invention, a condition for generating the first signal may be set. For example, if the user drags the object 220 to the predetermined position and then touches the object 220 for more than a first critical time, or a predetermined area, for example, 50%, of the object 220 passes through the predetermined position, the first signal may be generated.

In FIG. 2C, if the first signal is generated, a plurality of pages 211, 212, and 213 are displayed on a single screen.

In FIG. 2D, the user drags the object 220 onto a second page 212. If the object 220 overlaps with the second page 212, the second signal is generated. Similar to the condition for generating the first signal, a condition for generating the second signal may be additionally set. For example, if the user drags the object 220 to a predetermined position, touches the object 220 for more than a second critical time, and ends touching (i.e., touch-up), the second signal may be generated.

In FIG. 2E, the second page 212 is displayed on the screen in response to the second signal. The object 220 has been moved from the first page 211 and is now located on the second page 212.

When the user wants to move an object in a first page to a second page, the user cuts the object from the first page, switches to a second page with a flick or a scroll, and pastes the object in the second page. In this case, if the number of pages is large, it is very inconvenient to move an object to a desired page.

If a predetermined condition is satisfied, a plurality of pages are simultaneously displayed on a screen so that the user can easily move an object between a plurality of pages.

FIGS. 3A to 3D illustrate moving an object between pages, according to an embodiment of the present invention. In FIGS. 3A to 3D, moving an object between pages is described based on a page.

Figure 3A:
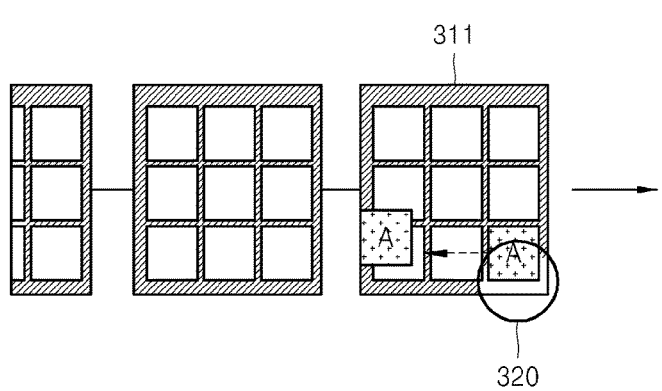
FIGS. 3A through 3D illustrate moving an object between pages, according to an embodiment of the present invention.

In FIG. 3A, while a plurality of pages are generated, only a first page 311 is displayed on a screen. A user selects a desired object 320 by touching & holding the object and dragging the selected object 320 to move the selected object 320 to an edge of the screen.

Figure 3B:
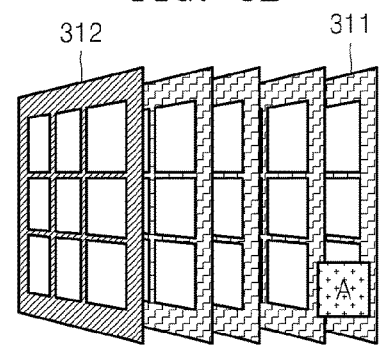

In FIG. 3B, when the user moves the object 320 to the edge of the screen, the plurality of pages are displayed on the screen inclined in a depth direction. The object 320 is displayed in a position not on the first page 311.

Figure 3C:
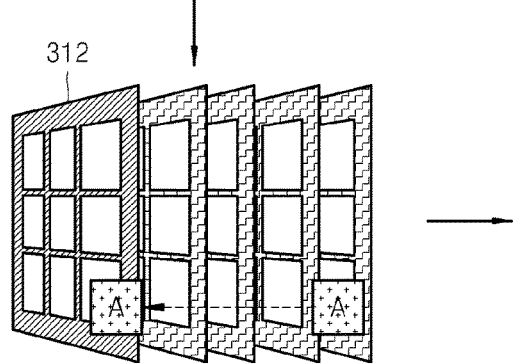

In FIG. 3C, the user drags the object 320 to a second page 312. When the user drags the object 320 to overlap with the second page 312 and touches the object 320 for more than the critical time, a feedback signal is generated.

Figure 3D:
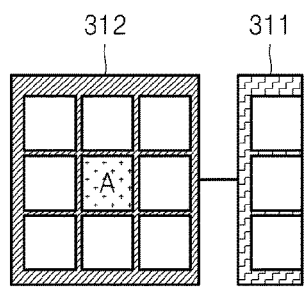

In FIG. 3D, if the user stops touching the object 320 after the feedback signal is generated, only the second page 312 including the object 320 is displayed on the screen. Although the object 320 is displayed in the middle of the second page 312 in FIG. 3D, a position at which the object 320 is displayed may vary according to embodiments, such as a right bottom or a left bottom.

Figure 4:
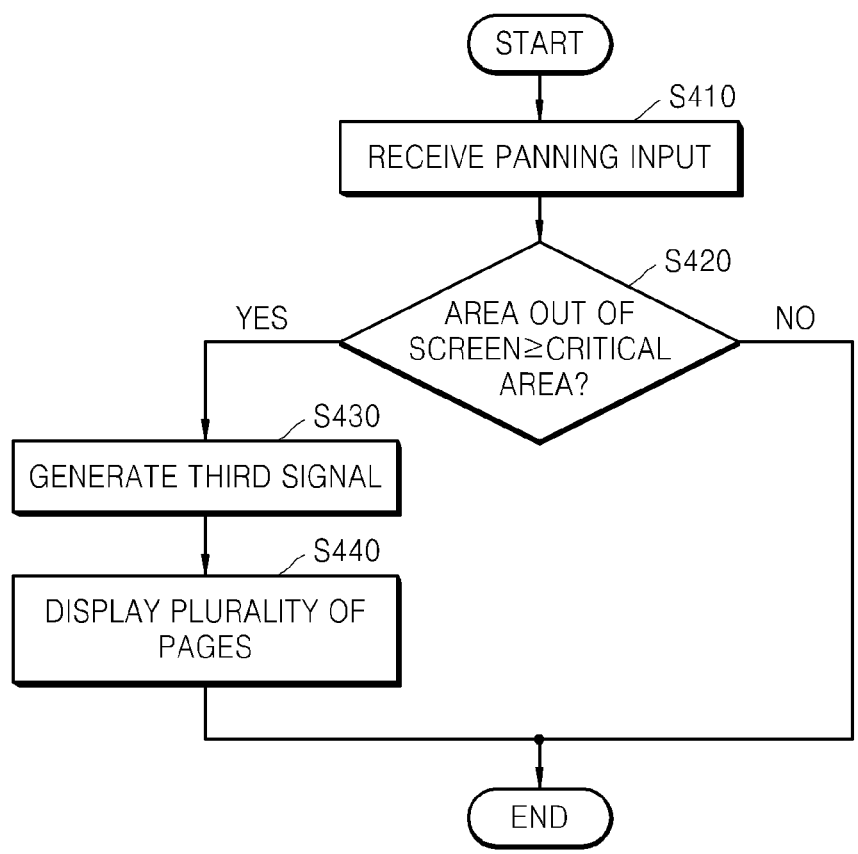
FIG. 4 is a flowchart illustrating a method of changing a screen according to a panning signal, according to an embodiment of the present invention.

FIG. 4 is a flowchart illustrating a method of changing a screen according to a panning signal, according to an embodiment of the present invention.

In step S410, a panning input to a first page is received. In step S420, it is determined whether a portion greater than a critical value in the first page is out of view of the screen. If a user performs panning on the first page, the first page moves on the screen. However, if the user continues panning the first page in the same direction, a portion of the first page may not be fully displayed on the screen. If a portion that is not displayed on the screen (i.e., a portion out of the screen) is greater than the critical value (for example, more than 50% of the first page), the method proceeds to step S430. Otherwise, it is determined that the panning input corresponds to a general panning process, and the method ends.

In step S430, a third signal is generated. In step S440, a plurality of pages are displayed. Thereafter, if the user selects one of the plurality of pages, only the selected page is displayed on the screen.

FIGS. 5A to 5E illustrate a process of changing a screen on which a web page is displayed according to a panning signal, according to an embodiment of the present invention.

In FIG. 5A, only a first page 511 is displayed on a screen. Only the first page 511 may be executed. However, even though a plurality of web pages are being executed, the other web pages may be hidden behind the first page 511 so as not to be displayed.

Figure 5:
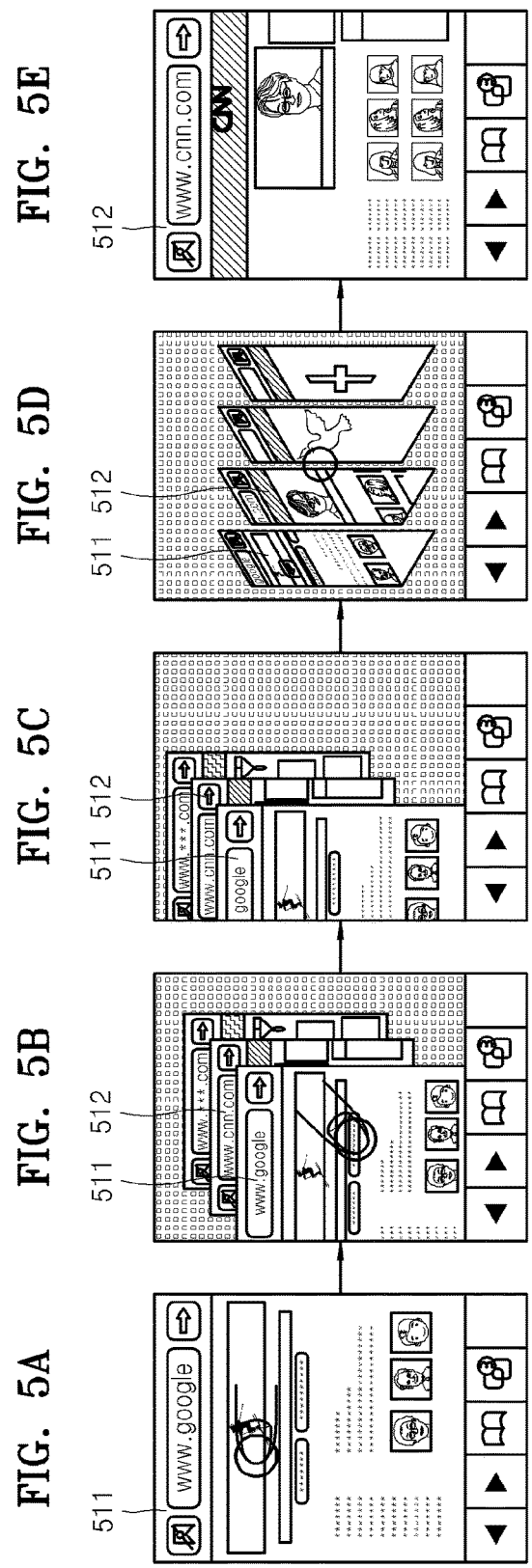
FIGS. 5A through 5E illustrate a process of changing a screen on which a web page is displayed according to a panning signal, according to an embodiment of the present invention.

In FIG. 5B, a user performs panning on the first page 511 with a fingertip or a stylus. In FIG. 5, in order to differentiate a drag input for moving an object from a panning input for moving a web page, it is determined if an object is selected by touching & holding for more than the critical time and is dragged, the object moves, and if a screen is dragged with a fingertip or a stylus without selecting any object, a web page moves.

In FIG. 5C, if the user continues panning the first page 511 such that more than half of the first page 511 disappears, the third signal is generated. It is then determined whether a touch & hold time after panning the first page 511 is greater than the critical time, and only if such touch & hold time is greater than the critical time, the third signal is generated. The third signal may also be generated by considering only a touch & hold time without considering what portion of the first page is out of a screen.

In FIG. 5D, the plurality of web pages are displayed inclined in a depth direction in response to the third signal. A mode in which a plurality of pages are displayed on a single screen may be indicated by an index mode. Thereafter, the user taps a second page 512 to select the second page 512.

In FIG. 5E, if the user finishes touching (i.e., touch-up or lets go), only the second page 512 is displayed on the screen.

When a plurality of web pages are loaded, the plurality of web pages are generally displayed so as to overlap one another. If the user wants to use a second web page hidden behind a first web page so as not be displayed while interacting with the first web page, the user selects one of the overlapping web pages after panning the first web page. If the plurality of web pages completely overlap each other, a desired web page may be selected only after panning each web page one-by-one. However, in the present invention, a desired web page may be easily selected with a single panning step.

Figure 6:
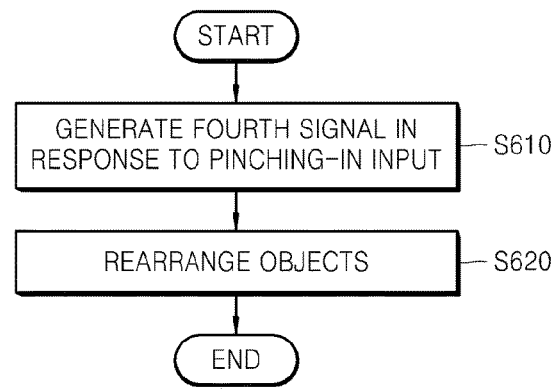
FIG. 6 is a flowchart illustrating a method of changing a screen on which a web page is displayed according to a pinching signal, according to an embodiment of the present invention.

FIG. 6 is a flowchart illustrating a method of changing a screen on which a web page is displayed according to a pinching signal, according to an embodiment of the present invention.

In step S610, if a pinching input is received, a fourth signal is generated. In step S620, objects which are a part of a page are rearranged to be easily recognized in response to the fourth signal. That is, the page is rearranged so that more objects than originally displayed can be displayed on the page. To accomplish this, a distance between objects may be adjusted, or a size of each object may be reduced. For example, objects for selecting music may originally be included in a page, with each object including a brief description, an artist, a music title, and others, and index information regarding the music or items corresponding to a category may be included as objects in a page. In response to the fourth signal, only indexes with respect to objects are displayed, and, thus, the space occupied by objects is reduced, or the provided information can be reduced in a page in which objects are rearranged in response to the fourth signal, wherein the page in which objects are rearranged is indicated by an index page.

Figure 7A:
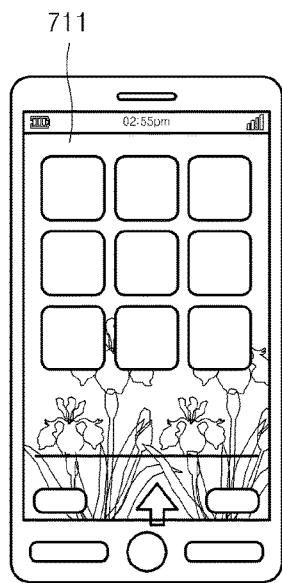
FIG. 7A through 7C are a first illustration of rearranging a page based on a pinching input, according to an embodiment of the present invention.
Figure 7B:
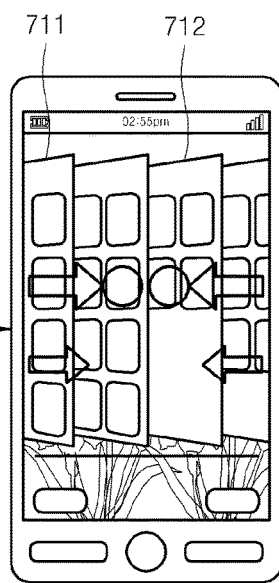
Figure 7C:
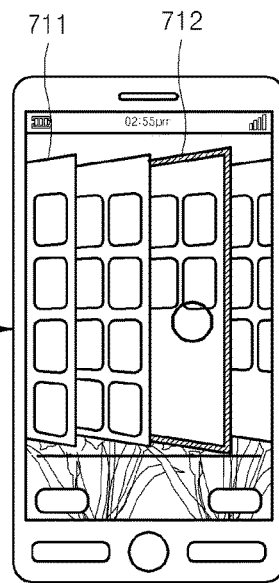

FIGS. 7A to 7C is a first illustration of rearranging a page based on a pinching input, according to an embodiment of the present invention.

In FIG. 7A, only a first page 711 is displayed on a screen. In FIG. 7B, a pinching input is input by a user.

If the pinching input is input by the user, the fourth signal is generated, and a plurality of pages are displayed inclined in a depth direction of the screen in response to the fourth signal.

In FIG. 7C, the user selects a second page 712.

If the user selects the second page 712, only the second page 712 is displayed on the screen.

Figure 8:
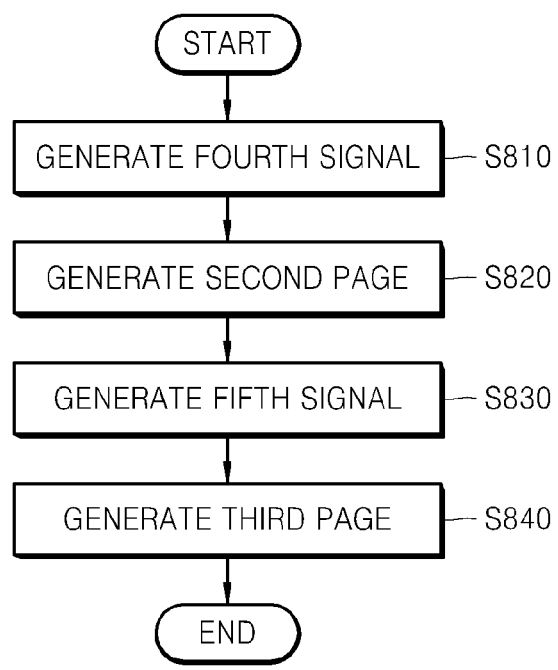
FIG. 8 is a flowchart of a method of outputting a page including an object in a higher category based on a pinching input, according to an embodiment of the present invention.

FIG. 8 is a flowchart of a method of outputting a page including an upper-layer object based on a pinching input, according to an embodiment of the present invention.

In step S810, if a pinching input to a first page including one or more objects is received, the fourth signal is generated. In step S820, in response to the fourth signal, an upper-layer object corresponding to objects of a higher category that are included in the first page is determined, and a second page including the upper-layer object is generated. In step S830, if a tap input for selecting one of the upper-layer objects is input by the user, a fifth signal is generated. In step S840, a third page, including one or more objects belonging to the selected upper-layer object, is generated in response to the fifth signal. Although a page is changed and displayed in response to the fourth or fifth signal in FIG. 8, only kinds or positions of objects displayed in the first page may be changed instead of changing attributes of the first page according to embodiments.

Figures 9A, 9B:
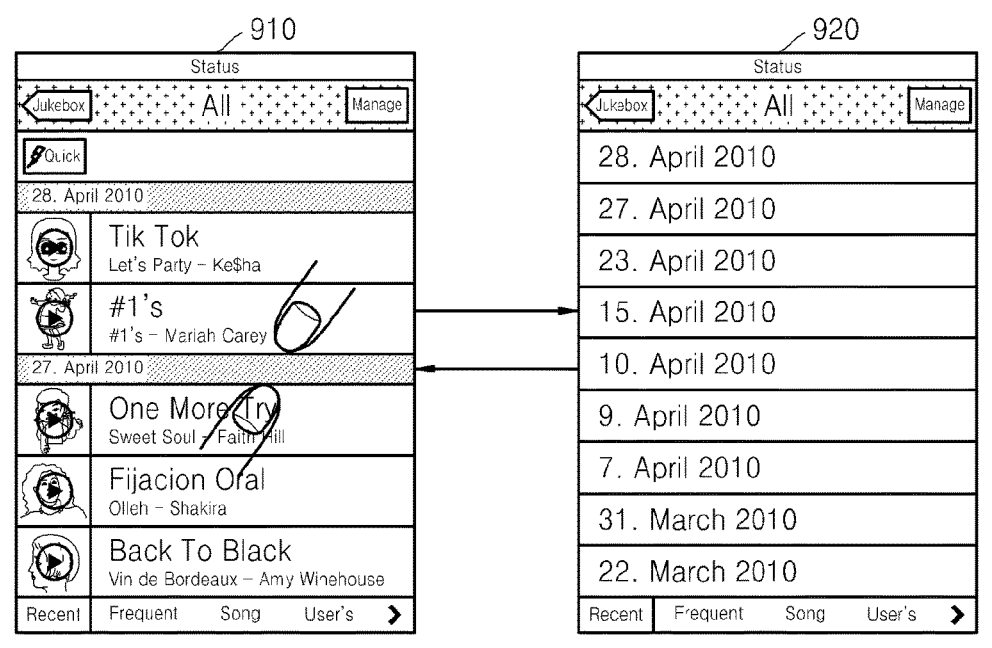

FIGS. 9A to 9B provide a second illustration of rearranging a page based on a pinching input, according to an embodiment of the present invention.

In FIG. 9A, a plurality of objects on a page are music icons. The music icons are arranged according to their release dates. Referring to FIG. 9A, there are two pieces of music distributed on Apr. 28, 2010 and three pieces of music distributed on Apr. 27, 2010.

if a pinching input is then input by a user, an index page 920, as shown in FIG. 9B, is displayed.

FIG. 9B shows the index page 920 according to the pinching input. The index page 920 includes upper-layer objects, each being representative of a set of lower-layer objects. For example, date objects representing music distributed on the same date, music title objects representing music having music titles with the same first syllable, and artist objects representing music composed by the same artist may be included in the index page 920. The index page 920, shown in FIG. 9B, includes date objects indicating distribution dates.

If the user selects a single date object, a first page 910, including objects corresponding to a lower category of the selected date item (or one or more adjacent date items), i.e., icons of music distributed on the selected date, is displayed. For example, if the user selects "27. Apr. 2010", the first page 910 will display icons of music distributed on Apr. 27, 2010.

In FIGS. 9A and 9B, it is assumed that the first page 910, including lower-layer objects, is displayed by an action of the user tapping an upper-layer object in the index page 920. However even when an unpinching input to the index page 920 is input by the user, the first page 910, including lower-layer objects, may be displayed.

FIGS. 10A to 10D provide a third illustration of rearranging a page based on a pinching input, according to an embodiment of the present invention.

In FIG. 10A, a user taps a "song" button at the bottom of a first page 1010 to redisplay music icons in a song title order.

In FIG. 10B, music icons in a second page 1020 are redisplayed in song title order. Thereafter, a pinching input is input by the user.

In FIG. 10C, an index page 1030 is displayed in response to the pinching input. The index page 1030 includes music title objects representing music content sets having music titles with a common first syllable. In the index page 1030, objects indicated alphabetically from letters a to z are displayed and then objects indicated according to the Korean alphabet from 'ㄱ' to 'ㅎ' are displayed.

The user may perceive objects indicating other characters through a panning action.

In FIG. 10D, if the user performs panning downwards on the index page 1030, objects corresponding to the Korean alphabet are displayed, and if the user performs panning upwards on the index page 1030, objects corresponding to the English alphabet are displayed.

FIGS. 11A to 11F provide a fourth illustration of rearranging a page based on a pinching input, according to an embodiment of the present invention.

Because FIGS. 11A to 11D are identical to FIGS. 10A to 10D, respectively, a description thereof will be omitted.

In FIG. 11E, an index page 1130 is displayed in response to a pinching input by a user.

Thereafter, an unpinching input to the index page 1130 is received. That is, the user touches the index page 1130 with two fingers, such as a thumb and a forefinger, and moves the fingers in a direction such that a distance between the fingers increases. However, the user does not stop touching the screen even after inputting the unpinching input to the index page 1130. It is assumed that the user performs an unpinching action between an object A 1131 and an object B 1132.

In FIG. 11F, while the user has not stopped touching the screen, music icons 1141 corresponding to the object A 1131 and music icons 1142 corresponding to the object B 1132 are displayed. Brief information regarding the object A 1131 and the object B 1132 may further be displayed (e.g., the number of songs included in each item, etc.).

Thereafter, if the user releases his fingers from the screen, a second page including the music icons 1141 and 1142 corresponding to the object A 1131 and the object B 1132 is displayed.

FIGS. 12A to 12D provide a fifth illustration of rearranging a page based on a pinching input, according to an embodiment of the present invention.

Figure 12A:
FIGS. 12A through 12D is a fifth illustration of rearranging a page based on a pinching input, according to an embodiment of the present invention.
Figure 12B:

In FIG. 12B, a first page 1210 in which music icons are arranged in a distribution data order is displayed. A user taps a "frequent" button at the bottom of the first page 1210 to rearrange the music icons in the frequency of play order.

In FIG. 12B, a second page 1220 in which music icons are rearranged in a play count order is displayed in response to the tap input of the user. Thereafter, a pinching input is input by the user.

Figure 12C:
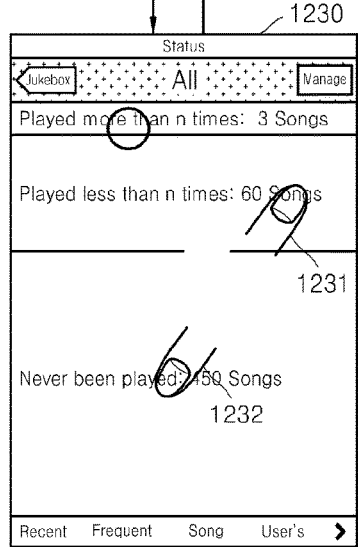

In FIG. 12C, an index page 1230, including upper-layer objects, is displayed in response to the pinching input. The index page 1230, shown in FIG. 12C, includes an object 1231 representing music played less than a certain number of times and an object 1232 representing music never played according to a music play count Thereafter, an unpinching input to the index page 1230 is received. However, the user does not stop touching even after inputting the unpinching input to the index page 1230.

Figure 12D:
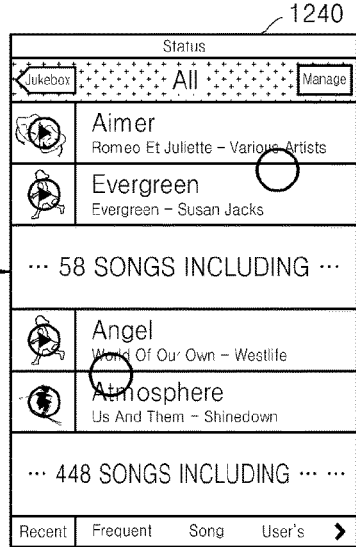

In FIG. 12D, while the user continues touching, a fourth page 1240, separately including music icons 1241 played less than a certain number of times and music icons 1242 never played, is displayed. A brief description of each group (e.g., the number of songs included in each group) may be displayed. Thereafter, if the user withdraws his fingers from a screen, the second page 1220 shown in FIG. 12B is displayed.

FIGS. 13A to 13E provide a seventh illustration of rearranging a page based on a pinching input, according to an embodiment of the present invention.

In FIG. 13A, an index page 1310, including character objects representing the first characters of music titles, is displayed. If a user selects a single object in the index page 1310, a page including one or more music icons corresponding to a character represented by the selected object, may be displayed.

The user performs a touch & hold action with respect to the index page 1310. It is assumed that the user selects an object Y 1311.

In FIG. 13B, sub-objects are displayed in response to the touch & hold action of the user. The sub-objects are objects indicating a plurality of sub-groups when lower-layer objects belonging to an upper-layer object are grouped in the plurality of sub-groups. The user may easily select desired music by simultaneously selecting an upper-layer object and a lower-layer object.

For example, in the index page 1310, an upper-layer object may indicate a first character of song titles, and a sub-object may indicate a second character of the song titles. In another example, in the index page 1310, an upper-layer object may indicate a first character of song titles, and a sub-object may indicate a first character of artist names.

In FIG. 13C, the user performs a panning action to search for sub-objects.

In FIG. 13D, the user selects a sub-object. It is assumed that the user selects an object "O" 1312.

In FIG. 13E, a first page 1320, including music icons having "Y" corresponding to an upper-layer object as a first character of song titles and "O" corresponding to a sub-object as a second character of the song titles, is displayed.

Figure 14:
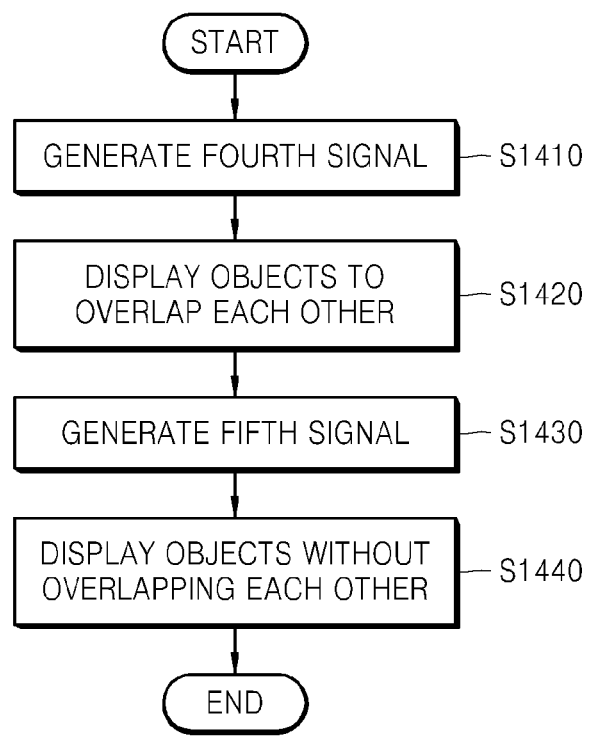
FIG. 14 is a flowchart of a method of rearranging objects in a page based on a pinching input, according to another embodiment of the present invention.

FIG. 14 illustrates a method of rearranging objects in a page, based on a pinching input, according to another embodiment of the present invention.

In step S1410, if a pinching input to a first page, including one or more objects, is received, the fourth signal is generated. In step S1420, a second page in which objects overlap each other is displayed in response to the fourth signal. In step S1430, if a tap signal for selecting an object included in the second page is received, the fifth signal is generated. In step S1440, a third page in which one or more objects adjacent to the selected object are displayed to be scattered without overlapping with each other is displayed in response to the fifth signal. While the touch input to the second page is maintained, a fourth page in which only objects placed in the same column as the selected object are displayed without overlapping each other is displayed. If the touch input ends, the third page, in which all objects placed in a plurality of columns adjacent to the selected object are displayed without overlapping each other, is displayed.

FIGS. 15A to 15D provide a sixth illustration of rearranging a page based on a pinching input, according to an embodiment of the present invention.

Figure 15A:
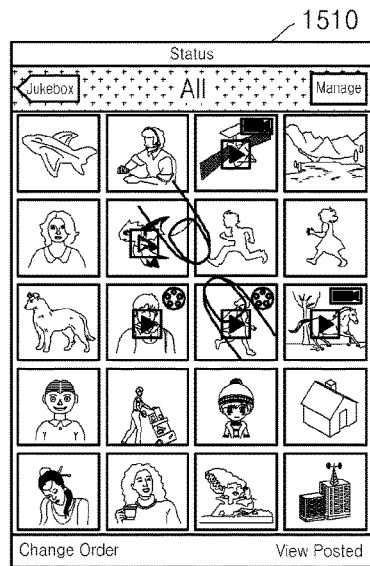
FIGS. 15A through 15D are an eighth illustration of rearranging a page based on a pinching input, according to an embodiment of the present invention.

In FIG. 15A, a first page 1510, including selectable photograph objects, is displayed. If a user selects a single object in the first page 1510, a photograph corresponding to the selected object may be magnified and displayed on a screen.

The user performs a pinching action with respect to the first page 1510.

Figure 15B:
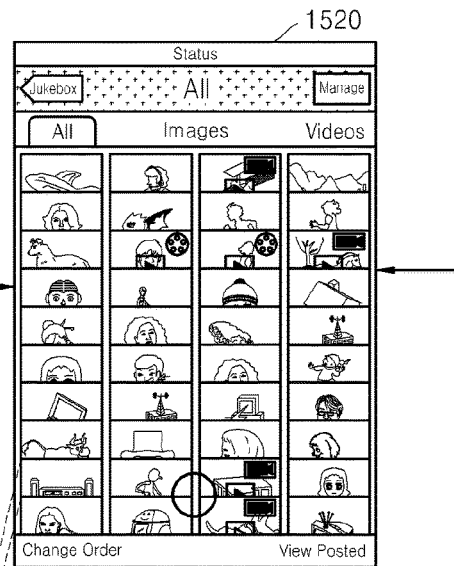

In FIG. 15B, an index page 1520, in which photograph objects are displayed to overlap each other, is displayed in response to the pinching action of the user. Even though the photograph objects are displayed to overlap each other, the photograph objects preferably overlap each other such that each object can still be identified. Thereafter, the user touches the bottom of the index page 1520.

Figure 15C:
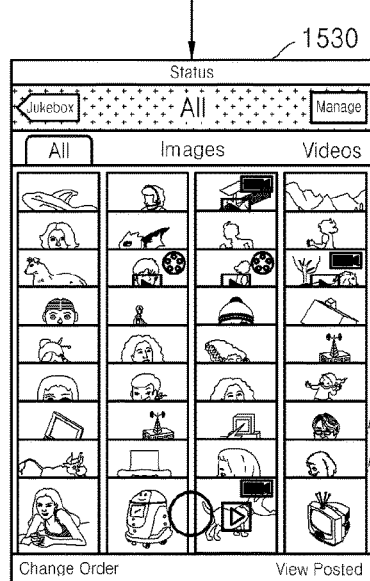

In FIG. 15C, only one or more photograph objects adjacent to the touched position are scattered in response to the touch action of the user, and objects displayed in the other areas are still displayed to overlap each other. In this embodiment, only objects displayed in the same column as the touched position are spread. Thereafter, the user withdraws a fingertip from the index page 1520.

Figure 15D:
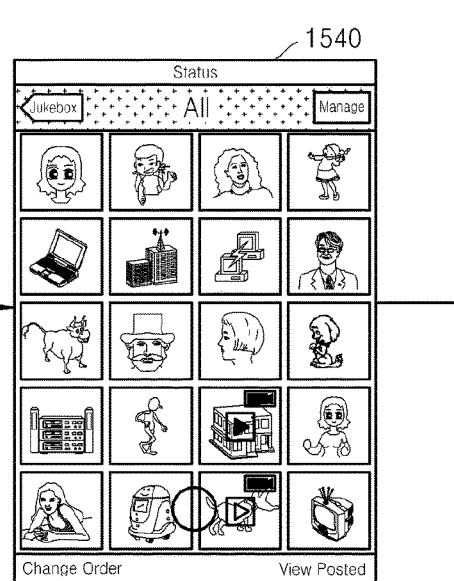

In FIG. 15D, a second page 1530, in which one or more photograph objects adjacent to the touched position are displayed without overlapping each other, is displayed in response to the touch-up action of the user.

Figure 16:
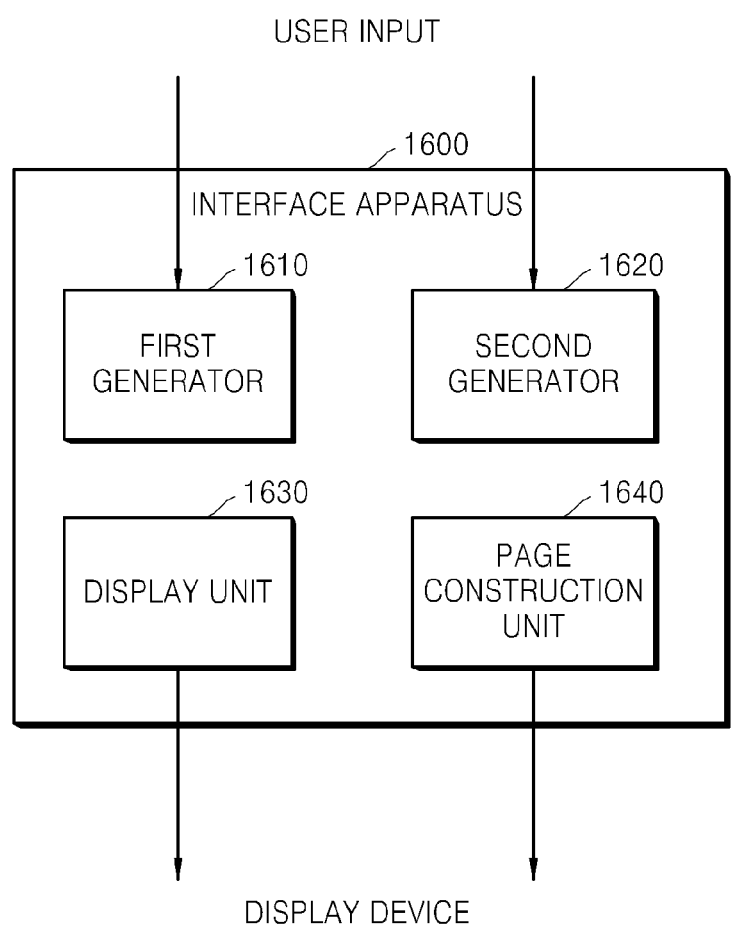
FIG. 16 is a block diagram of an apparatus for moving an object between pages, according to an embodiment of the present invention.

FIG. 16 is a block diagram of an apparatus 1600 for moving an object between pages, according to an embodiment of the present invention.

Referring to FIG. 16, the apparatus 1600 includes a first generator 1610, a display unit 1630, a second generator 1620, and a page construction unit 1640.

The first generator 1610 generates the first signal when an object in a first page moves to a predetermined area. According to embodiments of the present invention, a condition for generating the first signal may be added. For example, if the object moves to the predetermined area and is placed in the same position for a predetermined time while a user is still touching, the first signal may be generated. The predetermined area may be set according to various embodiments. One such area may be a position, such as an edge of a screen, having a lower probability of a user unintentionally moving the object to the predetermined area.

The display unit 1630 displays a plurality of pages, including the first page, in response to the first signal. The display unit 1630 may display the plurality of pages inclined in a depth direction of the screen or parallel to the screen with some of the plurality of pages overlapping one another.

The second generator 1630 generates the second signal when the object overlaps with a second page. A condition for generating the second signal may be strictly defined. For example, when a user touches the object and continues touching until the object overlaps with the second page, only if the user does not move the object for a predetermined time after the object overlaps with the second page, it may be set to generate the second signal.

The page construction unit 1640 moves the object to the second page in response to the second signal.

The apparatus 1600 may further include a third generator (not shown) for generating the third signal when a portion of a page out of a screen is greater than a critical value according to a panning input, a fourth generator (not shown) for generating the fourth signal according to a pinching input, and a fifth generator (not shown) for generating the fifth signal according to a tap input for selecting one from among objects.

Additionally, the page construction unit 1640 performs predetermined steps in response to the third, fourth and fifth signals.

For example, the page construction unit 1640 displays a plurality of pages in response to the third signal. The page construction unit 1640 displays a page, including objects corresponding to a higher category or a page in which objects are displayed so as to overlap each other, in response to the fourth signal. The page construction unit 1640 displays a page, including lower-layer objects belonging to a selected upper-layer object or a page in which objects are displayed to be spread without overlapping one another, in response to the fifth signal.

The embodiments of the present invention may be implemented as computer programs and can be implemented in general-use digital computers that execute the programs using a computer-readable recording medium. Examples of the computer-readable recording medium are magnetic storage media (e.g., Read-Only Memory (ROM), floppy disks, hard disks, and the like), optical recording media (e.g., CD-ROMs, or DVDs), and storage media (e.g., transmission through the Internet).

While this invention has been particularly shown and described with reference to embodiments thereof, it will be understood by one skilled in the art that various changes in form and details may be made therein without departing from the spirit and scope of the invention as defined by the appended claims and their equivalents.

What is claimed is:

1. A method of moving an object between pages of a screen, the method comprising:
   presenting a first page in a first size on the screen, wherein the first page includes a plurality of objects and is one of a plurality of pages;
   in response to a first touch input with respect to one object of the plurality of objects, moving the one object to an edge portion of the screen on which the first page is presented;
   wherein moving the one object to the edge portion of the screen causes all of the plurality of pages, including the first page and a second page, which overlap one another, to be presented in a reduced size with at least a portion of contents of the all of the plurality of pages being visible and presented inclined in a depth direction;
   in response to a second touch input with respect to the one object moved to the edge portion of the screen, moving the one object to the second page while the all of the plurality of pages overlap one another in the reduced size; and presenting only the second page on the screen after the object is moved to the second page, wherein the second page is presented as one page in the first size on the screen, and wherein a plane of the plurality of pages intersects the screen.

2. The method of claim 1, wherein the second page including the object is presented when a time during which the object moved by the second touch is presented on the second page is longer than a predetermined time.

3. The method of claim 1, wherein the second touch of the object is maintained until the object is presented on the second page.

4. The method of claim 1, wherein the object is moved to the edge portion of the screen on which the first page is presented, in response to touching the object for more than a first critical time, dragging the touched object to a predetermined area, and holding the object on the predetermined area for more than a second critical time.

5. An interface apparatus for moving an object between pages of a screen, the apparatus comprising:
    a controller for:
        presenting a first page in a first size on the screen, wherein the first page includes a plurality of objects and is one of a plurality of pages,
        in response to a first touch input with respect to one object of the plurality of objects, moving the one object to an edge portion of the screen on which the first page is presented, wherein moving the one object to the edge portion of the screen causes all of the plurality of pages, including the first page and a second page, which overlap one another, to be presented in a reduced size with at least a portion of contents of the all of the plurality of pages being visible and presented inclined in a depth direction,
        moving the one object to the second page while the all of the plurality of pages overlap one another in the reduced size, in response to a second touch input with respect to the one object moved to the edge portion of the screen, and
        presenting only the second page on the screen after the object is moved to the second page,
        wherein the second page is presented as one page in the first size on the screen, and wherein a plane of the plurality of pages intersects the screen; and
    a display for displaying the screen including at least one of the plurality of pages.

6. The interface apparatus of claim 5, wherein the second page including the object is presented when a time during which the object is moved by the second touch is presented on the second page is longer than a predetermined time.

7. The interface apparatus of claim 5, wherein the second touch input is maintained until the object is presented on the second page.

8. A non-transitory computer-readable recording medium storing a computer-readable program for executing a method of moving an object between pages of a screen, the method comprising:
    presenting a first page in a first size on the screen, wherein the first page includes a plurality of objects and is one of a plurality of pages;
    in response to a first touch input with respect to one object of the plurality of objects, moving the one object to an edge portion of the screen on which the first page is presented;
    wherein moving the one object to the edge portion of the screen causes all of the plurality of pages, including the first page and a second page, which overlap one another, to be presented in a reduced size with at least a portion of contents of the all of the plurality of pages being visible and presented inclined in a depth direction;
    in response to a second touch input with respect to the one object moved to the edge portion of the screen, moving the one object to overlap the second page while the all of the plurality of pages overlap one another in the reduced size; and
    presenting only the second page on the screen after the object is moved to the second page,
    wherein the second page is presented as one page in the first size on the screen, and wherein a plane of the plurality of pages intersects the screen.

* * * * *